(12) United States Patent
Teowee et al.

(10) Patent No.: US 6,762,676 B2
(45) Date of Patent: *Jul. 13, 2004

(54) VEHICLE COMPARTMENT OCCUPANCY DETECTION SYSTEM

(75) Inventors: Gimtong Teowee, Tuscon, AZ (US); Kevin McCarthy, Tuscon, AZ (US); Anoop Agrawal, Tuscon, AZ (US)

(73) Assignee: Donnelly Corp., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/315,706

(22) Filed: Dec. 10, 2002

(65) Prior Publication Data

US 2003/0090371 A1 May 15, 2003

Related U.S. Application Data

(63) Continuation of application No. 09/663,998, filed on Sep. 18, 2000, now Pat. No. 6,515,582, which is a continuation of application No. 08/901,929, filed on Jul. 29, 1997, now Pat. No. 6,166,625, which is a continuation-in-part of application No. 08/720,237, filed on Sep. 26, 1996, now abandoned.

(51) Int. Cl.[7] .............................................. B60R 25/10
(52) U.S. Cl. ............................. 340/426.1; 340/426.26; 340/426.29; 307/10.2; 250/342
(58) Field of Search ............................. 340/426.1, 429, 340/426.26, 426.29, 425.5, 430, 555, 556, 567, 573.1, 541, 565, 942; 307/10.2, 10.3, 10.4, 10.5; 180/167, 169, 287; 250/342, 353, 338.3, DIG. 1

(56) References Cited

U.S. PATENT DOCUMENTS

| | | | |
|---|---|---|---|
| 2,688,865 A | 9/1954 | Foster et al. .................. 70/129 |
| 3,241,344 A | 3/1966 | Peters .......................... 70/279 |
| 3,553,448 A | 1/1971 | Davis et al. .................. 240/7.1 |
| 3,582,639 A | 6/1971 | Chamberlain ................ 240/7.1 |
| 3,678,716 A | 7/1972 | Cobb ............................ 70/92 |
| 3,766,539 A | 10/1973 | Bradshaw et al. ......... 340/258 D |
| 3,829,693 A | 8/1974 | Schwarz ...................... 250/338 |
| 3,839,640 A | 10/1974 | Rossin ......................... 250/353 |
| 3,956,732 A | 5/1976 | Teich ............................ 340/64 |
| 3,992,909 A | 11/1976 | McGhee ....................... 70/379 |

(List continued on next page.)

FOREIGN PATENT DOCUMENTS

| | | |
|---|---|---|
| DE | 2636099 | 2/1978 |
| DE | 3732936 | 5/1989 |
| DE | 9006007 | 6/1991 |
| EP | 0235372 | 9/1987 |
| EP | 1039077 | 9/2000 |
| GB | 2252438 | 8/1992 |
| GB | 2266799 | 11/1993 |
| JP | 50-77938 | 7/1975 |
| JP | 58-188458 | 12/1983 |

OTHER PUBLICATIONS

Glolab disclosed a Pyroelectric motion sensor pp. 1–6.*

*Primary Examiner*—Nina Tong
(74) *Attorney, Agent, or Firm*—Fitzpatrick, Cella, Harper & Scinto

(57) ABSTRACT

A system is provided for detecting the presence of a human in a compartment of a vehicle that comprises a pyroelectric sensor and a control coupled to the pyroelectric sensor. The pyroelectric sensor comprises a first sensing element and a second sensing element. The first sensing element is arranged in an opposed electrical connection with respect to the second sensing element whereby infrared radiation from a human moving within the compartment is selectively detected by one of the first sensing element and the second sensing element, thereby producing an output signal of the pyroelectric sensor. This output signal is received by the control, and the control generates a control signal indicative of detection of a human within the compartment.

93 Claims, 8 Drawing Sheets

U.S. PATENT DOCUMENTS

| | | | |
|---|---|---|---|
| 4,007,955 A | 2/1977 | Kobayashi | 292/216 |
| 4,052,716 A | 10/1977 | Mortensen | 340/233 |
| 4,080,812 A | 3/1978 | Knott | 70/256 |
| 4,155,233 A | 5/1979 | Lira | 70/92 |
| 4,166,955 A | 9/1979 | Keller | 250/342 |
| 4,242,669 A | 12/1980 | Crick | 340/567 |
| 4,312,197 A | 1/1982 | Carrion et al. | 70/135 |
| 4,318,089 A | 3/1982 | Frankel et al. | 340/567 |
| 4,322,959 A | 4/1982 | Mochida | 70/241 |
| 4,342,210 A | 8/1982 | Denningham | 70/278 |
| 4,379,971 A | 4/1983 | Smith et al. | 250/342 |
| 4,384,207 A | 5/1983 | Doctor | 250/349 |
| 4,418,335 A | 11/1983 | Genahr | 340/565 |
| 4,437,003 A | 3/1984 | Doctor | 250/338 |
| 4,441,023 A | 4/1984 | Doctor et al. | 250/338 |
| 4,464,649 A | 8/1984 | Her | 340/72 |
| 4,468,657 A | 8/1984 | Rossin | 340/555 |
| 4,507,654 A | 3/1985 | Stolarczyk et al. | 340/545 |
| 4,556,796 A | 12/1985 | Renals | 250/338 |
| 4,604,524 A | 8/1986 | Kotlicki et al. | 250/342 |
| 4,612,442 A | 9/1986 | Toshimichi | 250/353 |
| 4,645,233 A | 2/1987 | Bruse et al. | 280/808 |
| 4,667,990 A | 5/1987 | Quantz | 292/201 |
| 4,697,081 A | 9/1987 | Baker | 250/338 |
| 4,704,533 A | 11/1987 | Rose et al. | 250/342 |
| 4,709,153 A | 11/1987 | Schofield | 250/353 |
| 4,745,284 A | 5/1988 | Masuda et al. | 250/338 |
| 4,746,910 A | 5/1988 | Pfister et al. | 340/567 |
| 4,752,768 A | 6/1988 | Steers et al. | 340/567 |
| 4,764,755 A | 8/1988 | Pedtke et al. | 340/541 |
| 4,775,347 A | 10/1988 | Takada et al. | 455/44 |
| 4,797,657 A | 1/1989 | Vorzimmer et al. | 340/541 |
| 4,825,079 A | 4/1989 | Takamatsu et al. | 250/338 |
| 4,848,114 A | 7/1989 | Rippe | 70/263 |
| 4,848,509 A | 7/1989 | Bruhnke et al. | 180/287 |
| 4,857,912 A | 8/1989 | Everett, Jr. et al. | 340/825.3 |
| 4,868,390 A | 9/1989 | Keller et al. | 250/338.3 |
| 4,874,063 A * | 10/1989 | Taylor | 187/391 |
| 4,881,148 A | 11/1989 | Lambropoulos et al. | 361/172 |
| 4,895,009 A | 1/1990 | Kleefeldt et al. | 70/264 |
| 4,930,864 A | 6/1990 | Kuster et al. | 350/167 |
| 4,933,668 A | 6/1990 | Oyer et al. | 340/541 |
| 4,952,808 A | 8/1990 | Turnbull et al. | 250/338.3 |
| 4,954,813 A | 9/1990 | August, Sr. et al. | 340/571 |
| 4,979,384 A | 12/1990 | Malesko et al. | 70/241 |
| 4,982,094 A | 1/1991 | Matsuda | 250/342 |
| 5,027,104 A | 6/1991 | Reid | 340/541 |
| 5,030,012 A | 7/1991 | Hagins et al. | 374/37 |
| 5,045,702 A | 9/1991 | Mulleer | 250/342 |
| 5,054,826 A | 10/1991 | Dow et al. | 292/125 |
| 5,063,371 A | 11/1991 | Oyer et al. | 340/541 |
| 5,071,160 A | 12/1991 | White et al. | 280/735 |
| 5,077,549 A | 12/1991 | Hershkovitz | 340/567 |
| 5,084,696 A | 1/1992 | Guscott et al. | 340/541 |
| 5,093,656 A | 3/1992 | Dipaola | 340/522 |
| 5,216,407 A | 6/1993 | Hwang | 340/426 |
| 5,219,413 A | 6/1993 | Lineberger | 180/272 |
| 5,283,551 A | 2/1994 | Guscott | 340/567 |
| 5,317,620 A * | 5/1994 | Smith | 379/40 |
| 5,424,711 A | 6/1995 | Muller et al. | 340/426 |
| 5,424,712 A | 6/1995 | Rosenberger | 340/426 |
| 5,424,718 A | 6/1995 | Muller et al. | 340/567 |
| 5,445,326 A | 8/1995 | Ferro et al. | 292/336 |
| 5,482,314 A | 1/1996 | Corrado et al. | 280/735 |
| 5,486,810 A | 1/1996 | Schwarz | 340/521 |
| 5,585,625 A | 12/1996 | Spies | 250/221 |
| 5,636,536 A | 6/1997 | Kinnucan | 70/107 |
| 5,663,704 A | 9/1997 | Allen et al. | 340/426 |
| 5,693,943 A * | 12/1997 | Tchernihovski et al. | 250/342 |
| 5,711,559 A | 1/1998 | Davis | 292/340 |
| 5,719,551 A | 2/1998 | Flick | 340/426 |
| 5,726,629 A | 3/1998 | Yu | 340/565 |
| 5,737,083 A | 4/1998 | Owechko et al. | 356/375 |
| 5,774,043 A * | 6/1998 | Mizuno et al. | 340/426.35 |
| 5,793,291 A | 8/1998 | Thornton | 340/573 |
| 5,805,056 A | 9/1998 | Mueller et al. | 340/426 |
| 5,848,802 A | 12/1998 | Breed et al. | 280/735 |
| 5,859,479 A | 1/1999 | David | 307/10.8 |
| 5,860,741 A * | 1/1999 | Tsao et al. | 374/129 |
| 5,887,466 A | 3/1999 | Yoshizawa | 70/257 |
| 5,910,854 A | 6/1999 | Varaprasad et al. | 359/273 |
| 5,933,090 A | 8/1999 | Christenson | 340/825.69 |
| 6,086,131 A | 7/2000 | Bingle et al. | 296/76 |
| 6,166,625 A * | 12/2000 | Teowee et al. | 340/426.26 |
| 6,480,103 B1 | 11/2002 | McCarthy et al. | 340/425.5 |
| 6,515,582 B1 * | 2/2003 | Teowee et al. | 340/426.1 |

\* cited by examiner

VEHICLE COMPARTMENT OCCUPANCY DETECTION SYSTEM

This application is a continuation of application Ser. No. 09/663,998, filed Sep. 18, 2000, now U.S. Pat. No. 6,515,582, which is a continuation of application Ser. No. 08/901,929, filed Jul. 29, 1997, now U.S. Pat. No. 6,166,625, which is a continuation-in-part of application Ser. No. 08/720,237, filed on Sep. 26, 1996, now abandoned, and entitled: Automotive Pyroelectric Intrusion Detection.

BACKGROUND OF THE INVENTION

1. Field of the Invention

This invention relates to the field of security systems for motor vehicles such as automobiles and aircraft, and, more specifically, to intrusion detection using pyroelectric detectors.

2. Related Background Art

Automotive theft is a serious problem in the United States and in many other countries. Many security devices, including car alarms, ultrasonic scanners, ignition sensors, central locking systems, hands-free cellular phones, kill switches, electronic or RF keys, steering wheel locking and vehicle tracking devices are available to address this problem.

These devices can be categorized as either original equipment manufacturer (OEM) systems, which are built into the automobile by the manufacturer, or after-market systems, which are added to the automobile subsequent to manufacture. In general, OEM systems are superior to after-market systems because they can be incorporated in an OEM supplied component to reduce or eliminate additional installation costs in the vehicle assembly plant. In contrast, after-market systems can be expensive, bulky and difficult to install. Existing OEM systems, however, are typically included only on high priced luxury cars. While OEM security devices are sometimes available as an option on less expensive vehicles, optional systems may have higher installation costs. An OEM security device that is inexpensive enough to include as standard equipment would be preferable.

Various types of OEM security devices are commercially available. One such device is an ultra-sound intrusion detection system described in U.S. Pat. No. 5,424,711. In this system, ultrasound emission and reception elements are provided as a plurality of separate elements located at or near the internal surface of the roof of the vehicle. More specifically, the elements are located in the region of the pillars between the front and the rear side panes.

The Clifford Electronics and Hornet auto security systems are two examples of commercially available after-market security systems. The Clifford systems, including the SuperNova II, the Arrow II and the Concept series, are radar based and are usually installed with the radar module located under the floor carpet in the center part of the vehicle. This system is available from Clifford Electronics, 20750 Lassen St., Chatsworth, Calif. 91311. The Hornet auto-security systems, ProSeries model, detects open vehicle doors and is electrically tied to the door circuitry. The system is available from Hornet Directed Electronics Inc., 2560 Progress St., Vista, Calif. 92083.

The above OEM and after-market systems, however, suffer from a number of significant drawbacks. In particular, due to their active nature, they require a relatively large amount of power. Due to the relatively large package size, the mounting of the devices in the pillars, under the floor carpet in the interior of the car, or in the doors is challenging. In some constructions, replacement in the event of malfunction is difficult. The body structure and the trim of the vehicle must also be designed to adequately accommodate these parts. In the Clifford systems, the radar may not function properly when certain metalized window tints are present. Finally, in the above described Hornet system, additional sensors and mechanisms are required to detect intrusion into the vehicle via other paths (i.e. open or broken windows), and water in the door may cause a malfunction due to the mechanical nature of the switches.

Intrusion detection systems may also be used in aircraft, which are often equipped with expensive equipment and systems. Currently available aircraft intrusion detection systems, however, are either too expensive or require a large installation space which is not available in many types of aircraft. For example, U.S. Pat. Nos. 4,933,668 and 5,063,371 describe aircraft security systems that include a central control unit with several remotely placed controllers and numerous sensors. These systems, however, tend to be bulky, heavy, complicated, and expensive. They consume large amounts of power, which may require the use of extra batteries or power supplies in the aircraft. This can increase the bulk and weight further still. In addition, installation of these systems can be very complicated and time consuming. U.S. Pat. No. 4,797,657 describes another type of portable detection system for use inside aircraft with delayed arming and activation but no remote access.

Until now, no intrusion detection systems have been available for use on-board aircraft that have sufficiently low power consumption, low weight, and do not require dedicated batteries. Similar considerations also apply for boats, busses, trucks, trains, and other uses.

One desirable attribute for intrusion detection systems for vehicles is low power consumption during operation. This allows the device to operate for extended periods of time while the vehicle is not being used without draining the battery. This is particularly important with cars and aircraft, which may sit unused for weeks or even months at a time. Thermal energy detection requires very little energy in comparison with active infrared and ultrasonic devices. Thus, the sensing of thermal energy is preferred over other means of detection. Thermal energy can be detected with a variety of devices such as thermistors, thermopiles, bolometers, and photon detectors. However, these thermal energy detectors do not have sufficient sensitivity in the detection of thermal fluctuations. Furthermore, photon detectors (i.e. HgCdTe detectors) must be cooled down to liquid nitrogen temperature (negative 195° C.) and thus are impracticable for use in vehicle intrusion detection systems.

Pyroelectric intrusion detection systems have been used as motion sensors inside buildings for security and intrusion detection purposes. Pyroelectric systems are passive in nature, and they detect the presence of an intruder in a defined area by sensing and responding to the thermal radiation of the intruder. However, pyroelectric intrusion detecting devices for buildings tend to be expensive, bulky and require a lot of power (e.g., several Watts). This makes them unsuitable for use in vehicles, where any intrusion system must be relatively inexpensive, compact, consume very low power, yet be reliable. Furthermore, building intrusion detection systems may not operate properly in a vehicle because of the extreme temperatures that can occur inside the vehicle.

Pyroelectric detectors have also been used inside automobiles for applications other than intrusion detection. U.S.

Pat. Nos. 5,071,160 and 5,482,314 are directed to infrared systems for use with air bag deployment or other types of safety restraint systems for protection of passengers in the event of a collision. These systems are designed to sense the presence, position and type of object in a seat, and provide a condition signal to the safety restraint system, such as an air bag. These systems can detect the presence and orientation of a child seat (front or rear-facing), an out-of-position occupant or other types of occupancy, and determine the appropriateness of deploying an air bag, thereby increasing the reliability and safety of an air bag activation system. More specifically, an ultrasonic acoustic sensor senses the position of the driver, a pyroelectric sensor senses the presence of the driver, a pressure transducer within the seat senses the approximate weight of the driver and an air bag control module triggers deployment of the air bag.

U.S. Pat. No. 5,585,625 describes yet another arrangement for detecting the presence, position, and type of object in a seat in vehicles. This system operates by illuminating the seat with infrared radiation and detecting an image of the seat using received radiation.

Each of these pyroelectric detector systems, however, are only used when the ignition of the vehicle is on. Moreover, none of these systems use a pyroelectric detector to detect intrusion into a vehicle. Prior pyroelectric detection systems were not suitable for use as intrusion detection systems in vehicles because they would consume too much power, and because they would be prone to false alarms in vehicular environments. In addition, none of the prior systems offer a low-power intrusion detection system for use in vehicles which can be easily integrated with other components of the vehicle.

SUMMARY OF THE INVENTION

One aspect of the invention relates to a method of preventing the theft of a vehicle by detecting an entry or an attempted entry of a person into the vehicle using a pyroelectric detector and generating an alert signal when the entry or the attempted entry is detected.

Another aspect of the invention relates to a method of detecting intrusion into a vehicle by detecting a presence of a person in the vehicle using a pyroelectric detector and generating an alert signal when the presence of a person is detected.

Yet another aspect of the invention relates to an apparatus for detecting the presence or entry of a person in a vehicle including one or more pyroelectric detectors. The detectors are mounted inside the motor vehicle, and each of the detectors has an electrical characteristic that changes when the infrared radiation arriving at the detector changes. The apparatus includes electronic circuitry responsive to changes in the characteristics of the detectors, and generates an alert signal when the characteristics indicate the entry or presence of a person in the vehicle.

The method and apparatus of this invention provide a low cost, low power, compact intrusion detection system for use in vehicles including automobiles and aircraft. This intrusion detection system can be advantageously used to prevent the theft of an entire vehicle. It can also be used to prevent the theft of equipment or systems from the vehicle, such as audio equipment in cars, or avionic equipment in aircraft. The system operates by detecting an entry (or an attempted entry) into the vehicle using a pyroelectric detector, and generating an alert signal in response.

This intrusion detector system, which may be advantageously integrated with various common automotive or avionic components, can monitor for sudden changes of the thermal profile of the vehicle interior, particularly when the vehicle is off. If desired, the detection system of this invention can include more than one detector to scan a larger field of view, or the field of view can be limited to specific areas in the vehicle such as the radio or steering wheel of an automobile.

The apparatus of this invention advantageously does not require a chopping system and is designed to minimize false alarms. In addition, if desirable, the detector system can be self-tuned to an optimal sensitivity depending on the ambient temperature and/or may include remote activation capabilities, thereby overcoming some of the problems of using pyroelectric detectors in vehicles.

Further advantages and features of the invention will become apparent to those skilled in the art upon an examination of the following detailed description of preferred embodiments taken in conjunction with the accompanying drawings.

DETAILED DESCRIPTION OF THE PREFERRED EMBODIMENTS

Figure 1:
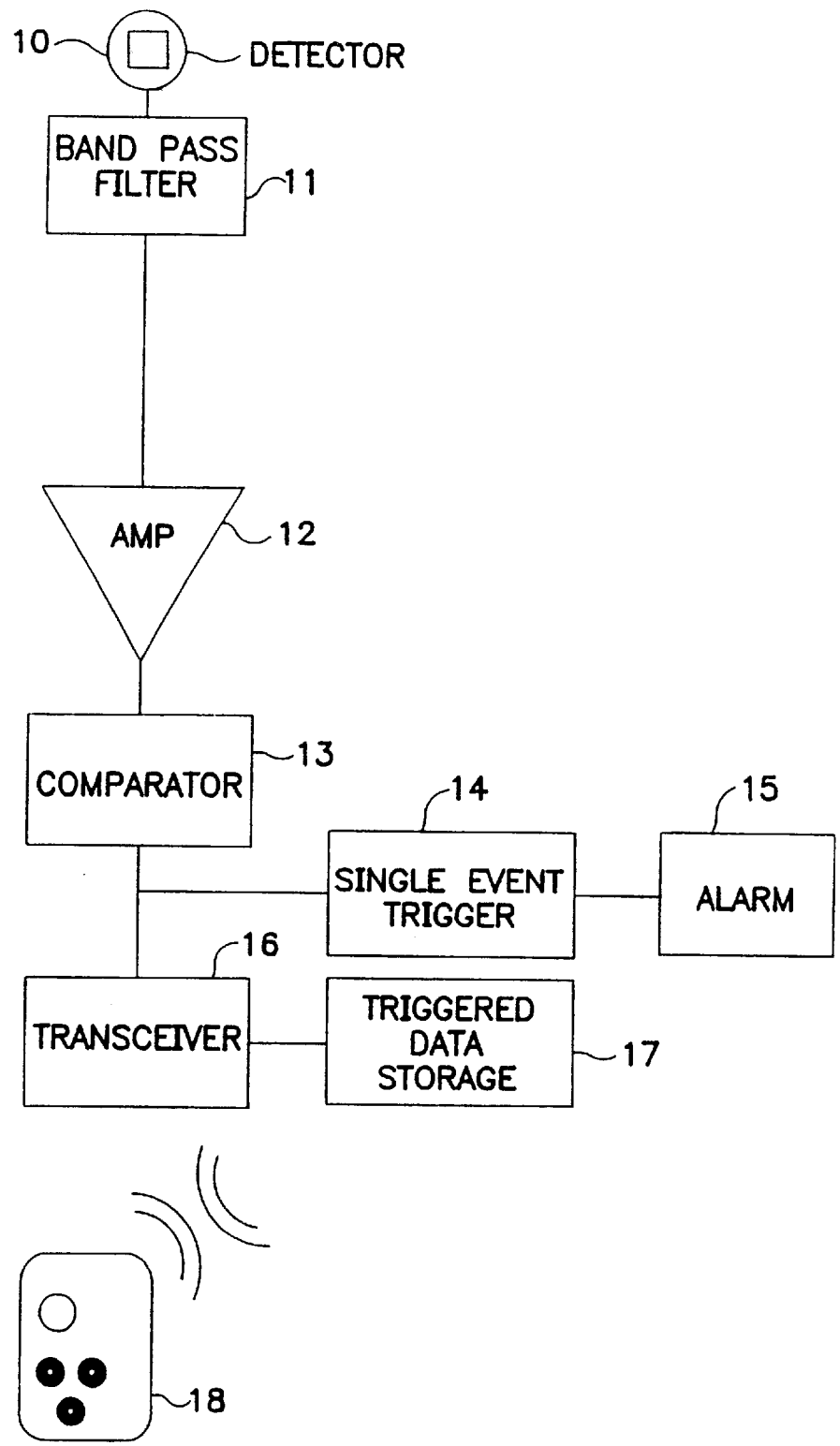
FIG. 1 is a block diagram of an intrusion detection system using a pyroelectric detector.

The present invention pertains to a pyroelectric detector system for use in vehicles, particularly for intrusion detection and anti-theft applications. The invention provides an inexpensive, highly reliable pyroelectric detector system which requires very low power to detect sudden changes in the thermal profile of the vehicle interior while the vehicle is not being used. Furthermore, the small size and simple circuitry of the pyroelectric detector system allow the system to be easily integrated with other vehicle components with little or no additional installation costs.

Pyroelectric technology is attractive for vehicular intrusion detection applications because pyroelectric detectors are very small and can easily be combined with other vehicle components. Pyroelectric devices, when compared with the other types of thermal energy detectors described above, yield the highest sensitivity level in the detection of thermal fluctuations. Furthermore, pyroelectric devices are broadband detectors and do not require cooling. In addition, pyroelectric devices are compatible with existing electrical systems and trimmings of many vehicles, and hence require minimal wiring. Finally, pyroelectric devices require very low power for operation, even while the vehicle is off, thereby preventing any significant power drain from the battery. The present invention provides a low-cost and highly reliable pyroelectric detector system with low-power requirements for use in vehicular applications.

In automobiles, the pyroelectric system of this invention can be easily combined with automotive rear view mirror assemblies or other existing components, thereby preventing any additional installation cost at the auto assembly plant. In aircraft, the present invention can be easily integrated into an instrument rack with a minimal amount of wiring.

Pyroelectric detectors are AC devices; they only detect temperature fluctuations caused by changes in thermal signatures—a fixed thermal scene will not result in any pyroelectric signal. Hence, pyroelectric detectors are ideal for detecting the motion of bodies with temperatures different from ambient. During an attempted entry, the opening of a door or a window will cause a sudden change in the thermal scene which can be sensed by the detector. The signal responses from the bodies or the changing thermal scene can be in the form of either currents or voltages which can later be processed to obtain the desired parameters (i.e. distance or temperature of detected bodies).

A pyroelectric detector (PED) is selected so that it has sufficient sensitivity to detect the thermal changes inside a vehicle. A desirable pyroelectric device should have good detectivity, preferably greater than $10^5$ cm Hz/W (and most preferably greater than $10^6$ cm Hz/W), low noise and high signal to noise ratio. Furthermore, it should be able to resolve a body at a temperature of about 37° C. moving at a frequency of approximately 5 Hz and at a distance of about 1–5 m. The pyroelectric detector system should require less than one Watt of power, and preferably less than 0.1 Watts, and most preferably less than 0.02 Watts, when the vehicle is not being used. This level of power consumption is much lower than the level required for pyroelectric detectors in buildings.

The location of the pyroelectric detector system is governed by several issues. First, external events such as wind gusts caused by the opening of a vehicle door and movement of bodies at temperatures different from the normal thermal scene should be taken into account. Secondly, it is desirable to maximize the monitoring of the interior area of the vehicle with a minimum number of detectors. Third, for anti-theft purposes, the detector should be directed towards the frontal cabin area of the vehicle. In intrusion detection systems, however, the rear part of the vehicle becomes equally important.

Typically, the human face is a desirable aiming point for the detector since it is generally warmer than the rest of the body and typically not clothed, and can therefore provide a large thermal signature. This property can be used to minimize the probability of false alarms by aiming the detector at those places where an intruder's face is likely to appear (e.g., a point of entry into the cabin of the vehicle), so as to exclude spurious signals from other heat sources. This can be accomplished easily by mounting the detector in a recessed hole.

Based on the above factors, excellent results can be obtained in automobiles when pyroelectric detectors are located on a rear view mirror assembly, which would be close to the face of any intruder attempting to drive away with a car. The location of the PED in the rear view mirror assembly is preferably rear-facing. In this configuration, the detector can be located, for example, anywhere in the bezel or casing that holds the glass, looking back into the vehicle interior. A bottom facing detector may also be used, in which case the detector may be located anywhere in the casing, looking down towards the seat cushion or dashboard area. Alternatively, the detector can be located in a module that attaches to the mounting structure of a rear view mirror such as a pod attached to the mounting arm. This arm is commonly attached to a mirror mounting button on a vehicle's windshield, or to a mirror mounting area that connects with the vehicle's header area. In yet another alternative embodiment, the detector may be located behind the glass of the mirror itself.

Figure 2A:
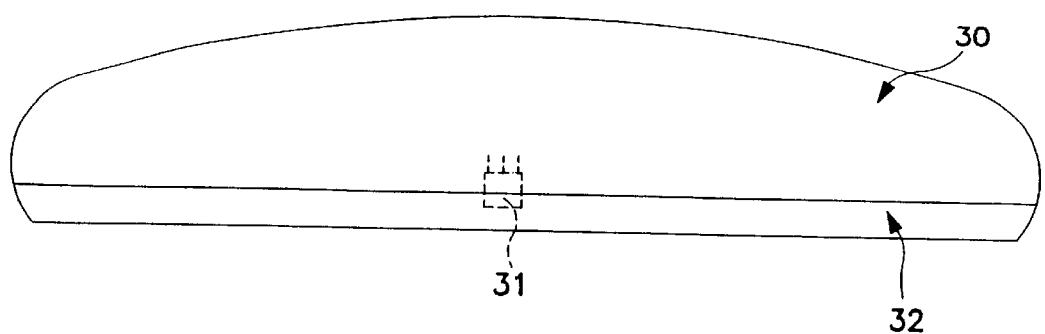
FIGS. 2a, 2b and 2c depict an automotive rear view mirror assembly incorporating a single pyroelectric detector.
Figure 2B:
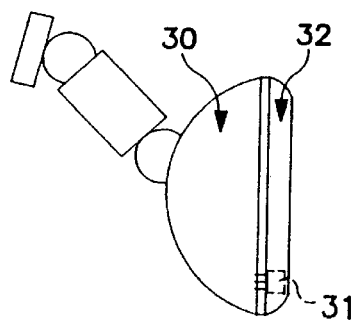
Figure 2C:
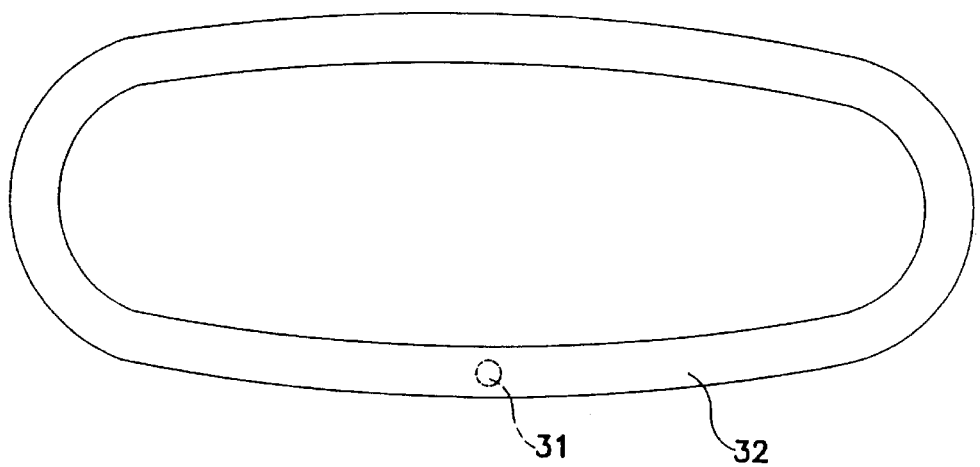

FIGS. 2a, 2b and 2c depict the top, side, and front view of a PED mounted in a rear view mirror assembly. The detector 31 is mounted in the bezel section 32 of the mirror assembly 30, so that it will face the back of the vehicle when the mirror is installed.

Figure 2D:
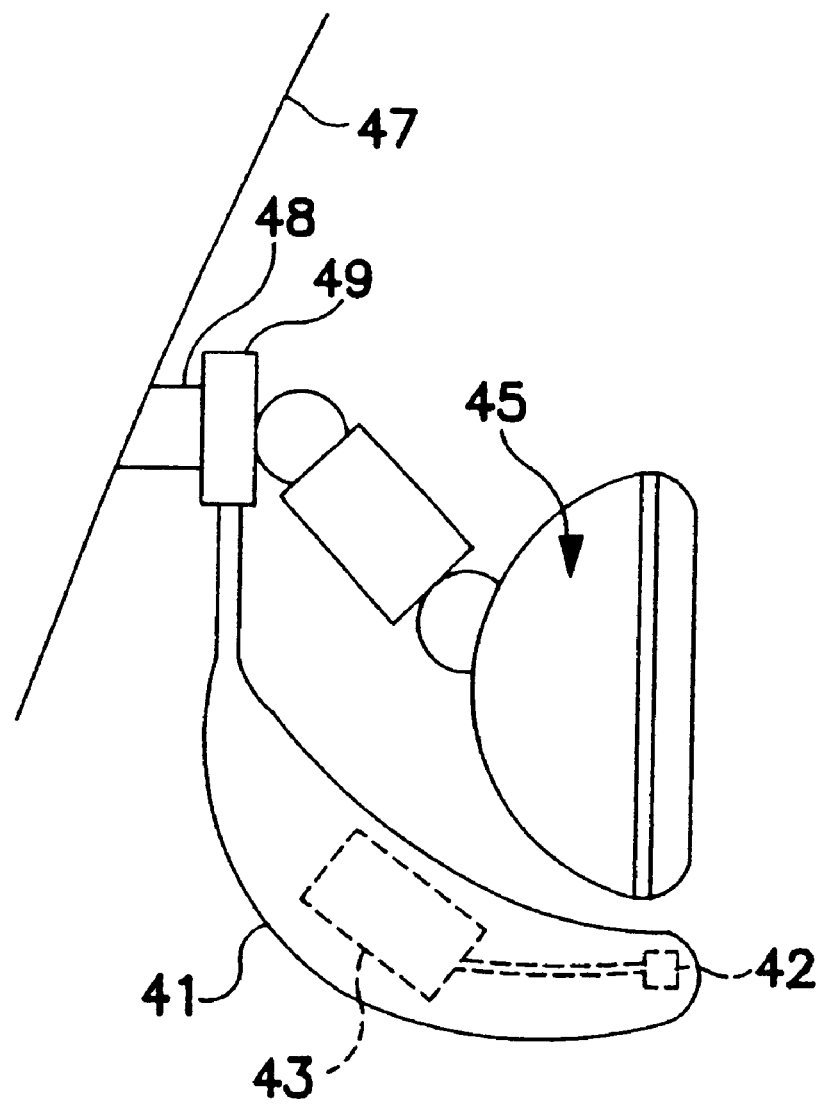
FIGS. 2d depict a side view of an automotive rear view mirror assembly with a pod-mounted detector.

In an alternative embodiment of mounting on a rear view mirror assembly, the rear view mirror assembly includes a pod within which the detector is mounted. FIG. 2d is a side view of this embodiment, which includes a pod 41 in which the pyroelectric detector 42 and the associated electronic circuitry 43 are housed. Preferably, the pod 41 is attached to the mirror mount 49, which attaches to the a mirror mounting button 48 affixed to the windshield 47. The detectors in this embodiment may be aimed as described above, except in this case, movement of the mirror 45 itself would not change the aim of the detectors. In other alternative embodiments, the pod could be attached, for example, to a support arm or the mirror housing. Alternatively, the detector could be mounted on or within a support arm.

Figure 3A:
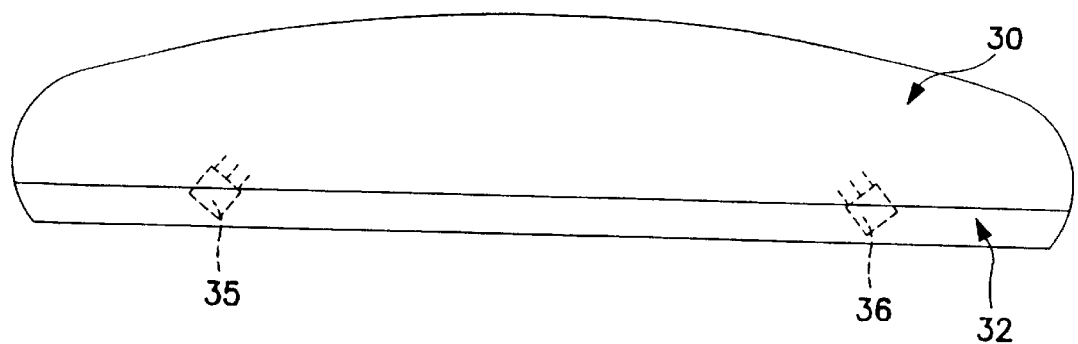
FIGS. 3a, 3b and 3c depict an automotive rear view mirror assembly incorporating two pyroelectric detectors.
Figure 3B:
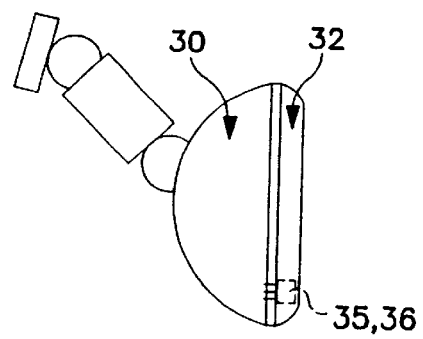
Figure 3C:
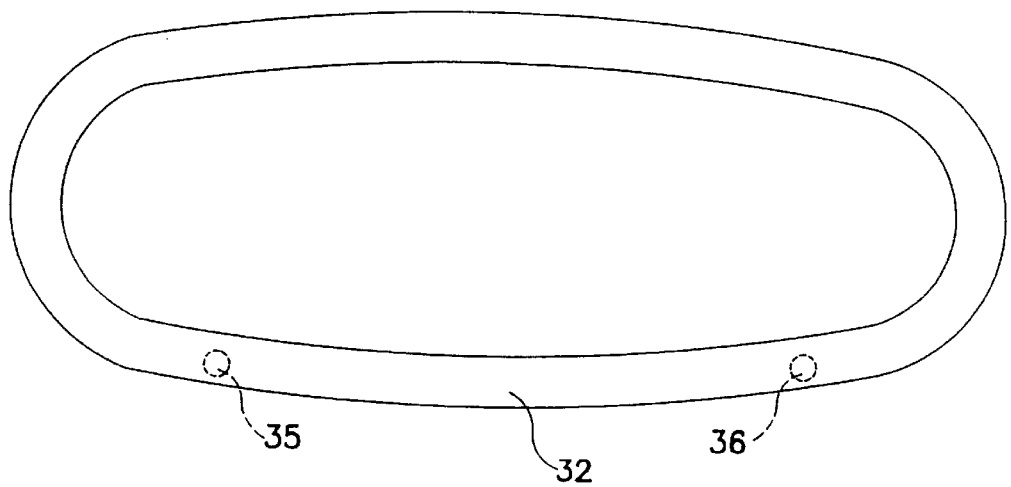

FIGS. 3a, 3b and 3c depict the top, side, and front view of a dual detector system using two pyroelectric detectors mounted in a rear view mirror assembly. The detectors 35 and 36 are mounted in the bezel section 32 of the mirror assembly 30, so that the detectors 35 and 36 will face toward the driver and passenger seats when the mirror is installed. Alternatively, the two detectors may be placed in a pod (not shown), similar to the pod for the single detector embodiment. As described above, the detectors are preferably aimed at places where an intruder's face is likely to appear. By using two detectors with narrow fields of view, each detector can be aimed at one of these places, further reducing the probability of a false alarm, while still providing intrusion detection for both sides of the car.

In the practice of the method of this invention the detector can be located in any assembly or at any point in the interior of the invention, although location in the mirror assembly is most preferred. For example, the detector can also be located anywhere in the front or back pillars. For anti-theft purposes, it can be located in any of the pillars of the vehicle such as one of the front pillars. However, if the detector is located on the driver-side front pillar, care should be taken such that the steering wheel does not obstruct the detector's field-of-view. Larger vehicles such as vans or buses may require an additional detector in the rear pillar to monitor the rear of the vehicle below the seat height.

Another alternative location for the detectors is in a window assembly, including, for example, mounting the detectors in the window trim. This position is particularly advantageous when encapsulated windows are used, including automotive backlites (i.e., rear windows). With encapsulated windows, the window and the edge trim are encapsulated using a process such as extrusion, injection molding, or reaction injection molding. Typical materials for such encapsulation are thermoplastic olefins, plasticized polyvinyl chloride, thermoplastic polyurethane, ethylene propylene diene monomer, and two component urethane systems. When encapsulated windows are used, the PED may be incorporated into the window trim during the encapsulation process. These detectors could provide enhanced coverage for large vehicles, low power consumption, and attractive aesthetics. The window mounted detectors could be integrated with other sensors in the vehicle, or could be the only sensors in the vehicle. This arrangement can eliminate the need for adding conductive patterns to the windows for detecting window glass breakage. Alternatively, the detectors and the associated circuitry can be adhered to the window itself, preferably housed in an appropriate housing.

In automobiles, the detector may also be located in the center of the steering wheel, close to the horn in the spokes of the wheel or in the top center of the wheel. The detector may also be positioned in the headliner, grab-bar, console, or domelight, or anywhere on the back or front of one or both visors. It may also be located on the dashboard, preferably towards the top section and rear-facing such that a larger area of the vehicle is covered. The detector may be located in the clock, the radio, the HVAC control panel or other accessories mounted on the dashboard, again offering the luxury of easy integration without additional assembly cost. Positioning the detector on the sunroof offers an attractive option for monitoring the entire interior of the vehicle. The integration of the detector with existing components offers the advantage of added functionality and value without the burden of added assembly cost in automotive plants. Finally, the detector may be located in places where the intruder is more likely to hide such as the rear-seating area, trunk or underneath the vehicle.

Figure 8:
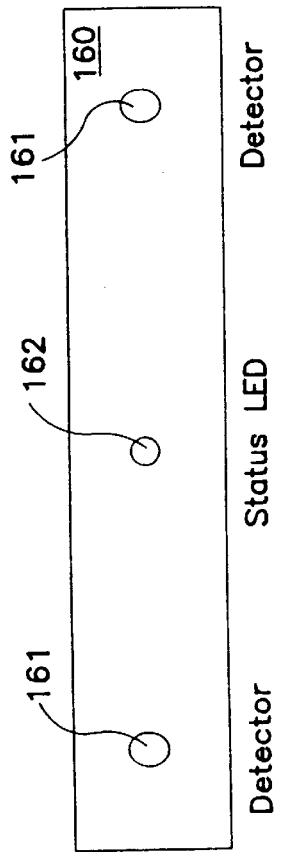
FIG. 8 depicts the front of a rack mounted intrusion detection system for use in aircraft.

In the case of aircraft, it is preferable if the entire system fits in a standard instrument aircraft rack (i.e., 6.5" wide by 1" high) commonly used for the installation of different electronic systems. This rack can be installed next to other instrument panels inside the cockpit. As depicted in FIG. 8, the detectors 162 may be included on the front panel of the rack 160. The total weight of the system should preferably be kept lower than 10 lbs, but most preferably lower than 2 lbs.

Instead of mounting the pyroelectric sensors on the front panel of the rack mounted instrument, they may be mounted on a remotely located detector module. When space is at a premium, such as on aircraft dashboards, this module can be made relatively small, (e.g., on the order of one or two square inches). This detector module may be connected to the rack mounted unit via appropriate cabling.

The best location for the detector module is along the sight of the intruder, which would include the panel dashboard, windows, upper consoles, doors and other points of entry in aircraft. Since the module is small, it can be positioned in any of the above locations and connected to the instrument rack using appropriate cabling. Cockpit-mounted detectors may be replaced with detectors located in other areas of the aircraft, such as passenger compartments, cargo holds and aircraft exteriors. A number of detectors located at different parts of the aircraft may also be used, and optionally integrated into a single system.

FIG. 1 shows a block diagram of a pyroelectric system. The system includes a pyroelectric detector 10, a band-pass filter 11, an amplifier 12, a comparator 13, a single event trigger 14, an alarm buzzer 15, a pair of transceivers 16, 18, and a triggered data storage unit 17. The band-pass filter 11 allows only certain frequencies (typically 0.5–10 Hz) to pass through the amplifier unit. Therefore, frequencies lower than 0.5 Hz, which correspond to slow events or motion such as air convection or changes in the interior ambient temperature will not be detected. Other suitable pass bands include 1–5 Hz, and 0.1–10 Hz. Using a narrower pass band decreases the probability of a false alarm, but can also increase the probability of not detecting a real intrusion. For example, a pass band of 0.01–100 Hz would work, but would be more susceptible to false alarms.

Selection of the pass band overcomes one of the problems of adapting a typical house PED system to a car. Because houses are large, an intruder would ordinarily be detected by a home PED when he is between 5 and 50 feet away from a detector. The motion of an intruder at these distances result in low frequency signals at the PED output. In contrast, the short distances inside a car of about 1–3 feet would result in higher frequency signals. Meanwhile, in a car, environmental factors, such as a cloud passing over the sun, can produce low frequency signals. By filtering out these low frequency signals, the chance of a false alarm can be reduced. In small aircraft, a similar band pass filter may be used. This band may be opened up to include lower frequencies in larger aircraft.

The amplifier 12, which may include a preamplifier stage, amplifies the current or voltage signals generated by the pyroelectric detector in response to external conditions. Including a preamplifier can help reduce noise. A comparator circuit 13, having low and high thresholds, can be used to trigger the alarm. The thresholds of the comparator can be adjusted by the user to control the sensitivity of the system to detect an intruder while avoiding spurious false alarms due to background thermal fluctuations such as air turbulence. The single event trigger 14 ensures that when the alarm 15 is turned on upon registering an event from the comparator, it will remain on for a predetermined time. This single event trigger may comprise a monostable multivibrator (i.e. a "one-shot").

Each PED 10 may comprise single or multiple elements enclosed in the same package. The package may be a standard TO-5 Transistor package, which is a popular metal can package. A PED packaged in plastic such as epoxy, polysilane or silicone may also be used. The package may include thin film elements, a thick film load resistor, and a Junction-Field-Effect Transistor (JFET) pre-amplifier. Preferably, all components are hermetically sealed in the package.

When a pyroelectric detector with a single sensing element is used, the system can be overly sensitive to changes in ambient temperature, which could result in false alarms. Using PEDs with two sensing elements arranged in a parallel opposed connection solves this problem. In this configuration, equal radiation arriving at both elements will be cancelled, while a defined moving radiation source that passes selectively through at least one of the elements will produce a detectable output. Similar results can be achieved when the two elements are arranged in a series opposed connection.

Figure 4:
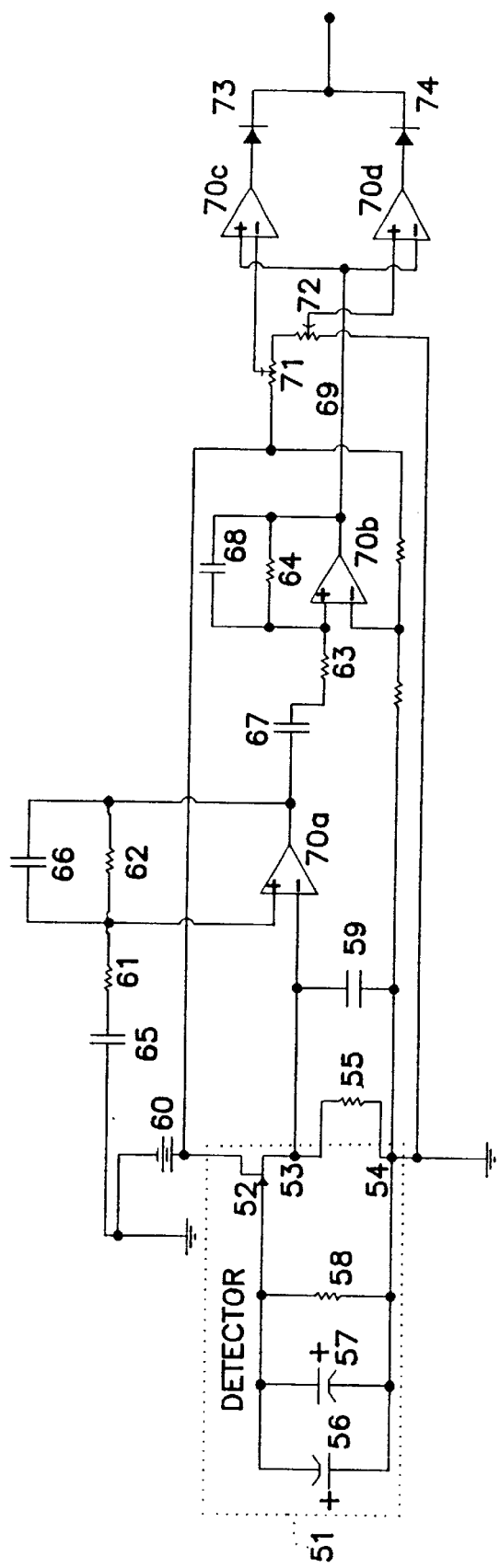
FIG. 4 is a circuit diagram for a single detector system.

FIG. 4 depicts a circuit that may be used for pyroelectric detection using a single detector with two parallel opposed sensing elements. The circuit includes the detector, which is preferably housed in a three terminal TO-5 metal can package 51, indicated by the dashed line. Included in the TO-5 package are the pyroelectric elements 56, 57, the load resistor 58, and the impedance matching J-FET pre amplifier 52. A detector with series opposed sensing elements may be used in place of the parallel opposed connection shown in FIG. 4. Alternatively, each of the detecting elements 56, 57 may be replaced with a pair of detecting elements connected in series.

The output from the detector is taken from the source of the J-FET 52. The source of the J-FET is connected to the TO-5 housing ground pin 54, via a resistor 55. The drain of the J-FET 52 is connected directly to the 9 volt power supply 60. In place of the battery 60 shown, an LM7809 voltage regulator (not shown) may be used to regulate the vehicle's 12 volt system down to 9 volts. A polarized capacitor 59 filters the signal, allowing only the low frequency components of the signal to reach the input of op-amp 70a. The signal is amplified by the op-amp 70a, with the gain determined by the ratio of the resistors 61 and 62. The capacitors 65 and 66 also act as part of a first band-pass filter. The signal then passes through to the second amplification stage through capacitor 67 which also only allows AC signals to pass. This capacitor also serves a secondary function in the low frequency end of the second band-pass filter in conjunction with capacitor 68. The filtered signal is amplified by op-amp 70b, with the gain determined by the ratio of resistors 63 and 64.

The filtered and amplified signal 69 is then sent to the window-comparator stage of the circuit 70c, 70d. The signal is routed to the non-inverting input of the upper threshold stage 70c, and the inverting input for the lower threshold stage 70d. The voltage thresholds are set by trimming the potentiometers 71, 72. The output of the window-comparator stage is zero unless the signal is above or below the set thresholds, in which case the output is a positive voltage which crosses one of the diodes 73, 74 and signals an alarm. Setting the threshold values close to the baseline results in high sensitivity but may also result in excessive false alarms.

A significant increase in field of view can be obtained by using multiple detectors which may eliminate the need for optics. Each package may comprise multiple twin sensing element detectors, with each twin sensing element pair compensating for temperature individually. This may allow for increased sensitivity while minimizing the thermal noise associated with changes in the vehicle's ambient temperature. This configuration provides benefits not found in PED based home intrusion detection systems.

Figure 5:
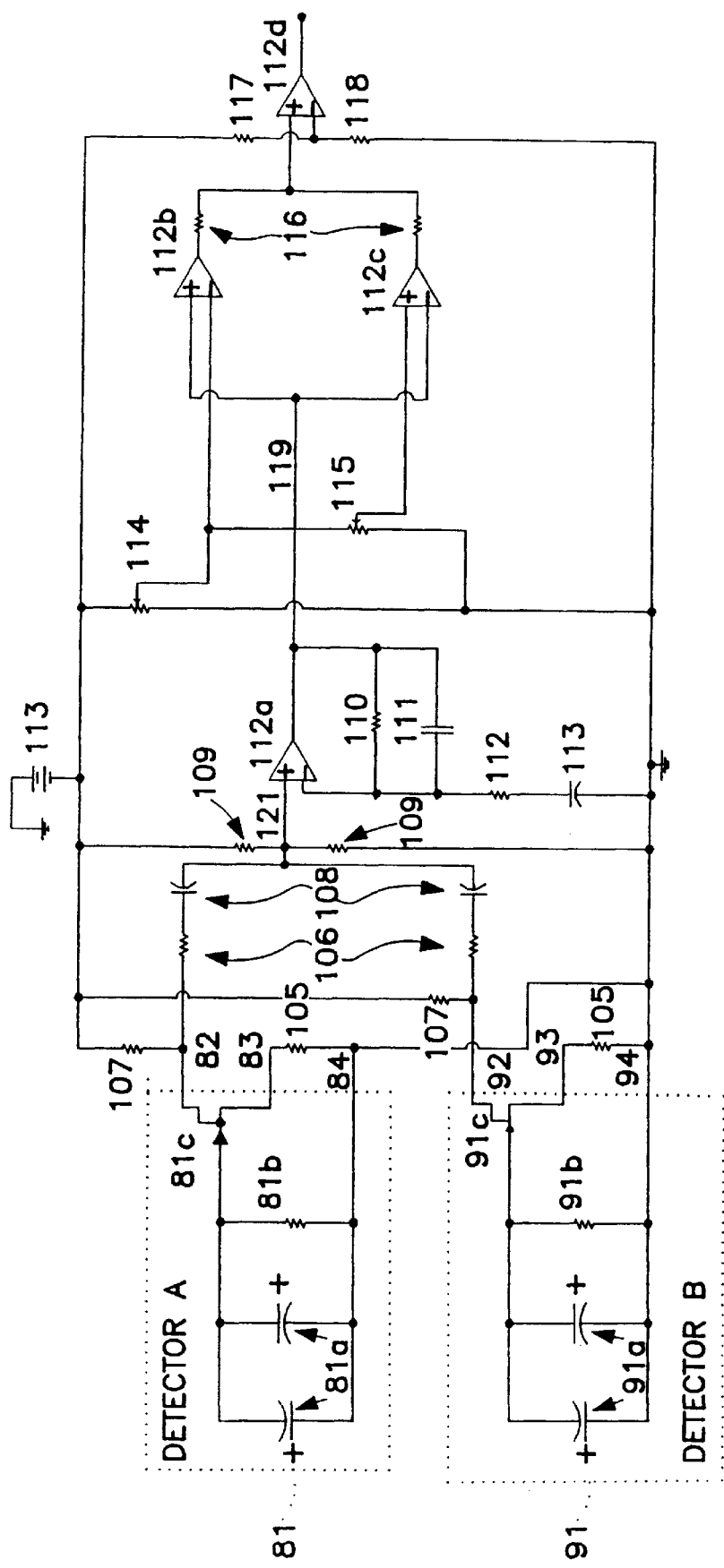
FIG. 5 is a circuit diagram for a dual detector system.

FIG. 5 depicts a circuit that uses two pyroelectric detectors 81 and 91, each of which is preferably housed in a three terminal TO-5 metal can package, indicated by the dashed line. Included in the TO-5 package are the pyroelectric elements 81a and 91a, load resistors 81b and 91b, and impedance matching J-FET pre amplifiers 81c and 91c. Preferably, the pyroelectric elements in each detector are connected in a parallel-opposed configuration, as shown in FIG. 5. However, other configurations, including single element detectors and series-opposed element pairs, may also be used. The output from each detector is taken from the drains of the J-FETs 82, 92. The sources of the J-FETs 83, 93 are connected to the TO-5 housing ground pin 84, 94, via the resistors 105. The resistors 107 are connected between each output 82, 92 and the 9 volt power-supply 113. The two detectors baselines are summed via resistors 106 and capacitors 108. An amplifying band pass filter is formed by the LM324 op-amp 112a and the resistors 110 and 112 and the capacitors 111 and 113. As with the single detector version, the amplifier-filter can be adjusted to achieve the desired gain and frequency characteristics. The capacitor 113 allows for amplification of only low frequency AC signals, while still maintaining a stable DC operating point. Gain is set by adjusting the ratio of resistors 110 and 112. The band-pass filter is set by resistor 110 and capacitor 111 (at the low frequency end) and resistor 112 and capacitor 113 (at the high frequency end). The signal 121 is connected to the input of the filter-amplifier. Resistors 109 provide a bias current path as well as establish a quiescent DC input voltage for the amplifier-filter.

The output of the amplifier-filter 119 goes to the input of the window comparator stage 112b, 112c. The thresholds are set by the resistor trimmers 114, 115. The outputs of the window comparators 112b, 112c are sent across equal valued resistors 116 and then on to the non-inverting input of the final stage of the quad op-amp 112d. The op-amp 112d sums the two window-comparator voltages. Either op-amp 112b or op-amp 112c will be high or both will be low. The voltage at the non-inverting input of op-amp 112d will therefore be approximately 4.5 volts when both sensors are outside the window, or approximately zero volts when both sensors are inside the window. The reference voltage at the inverting input of op-amp 112d is set at approximately 3 volts by the resistor divider formed by the resistors 117, 118. The output of op-amp 112d will therefore go to the positive rail whenever either 112b or 112c goes high.

Figure 6:
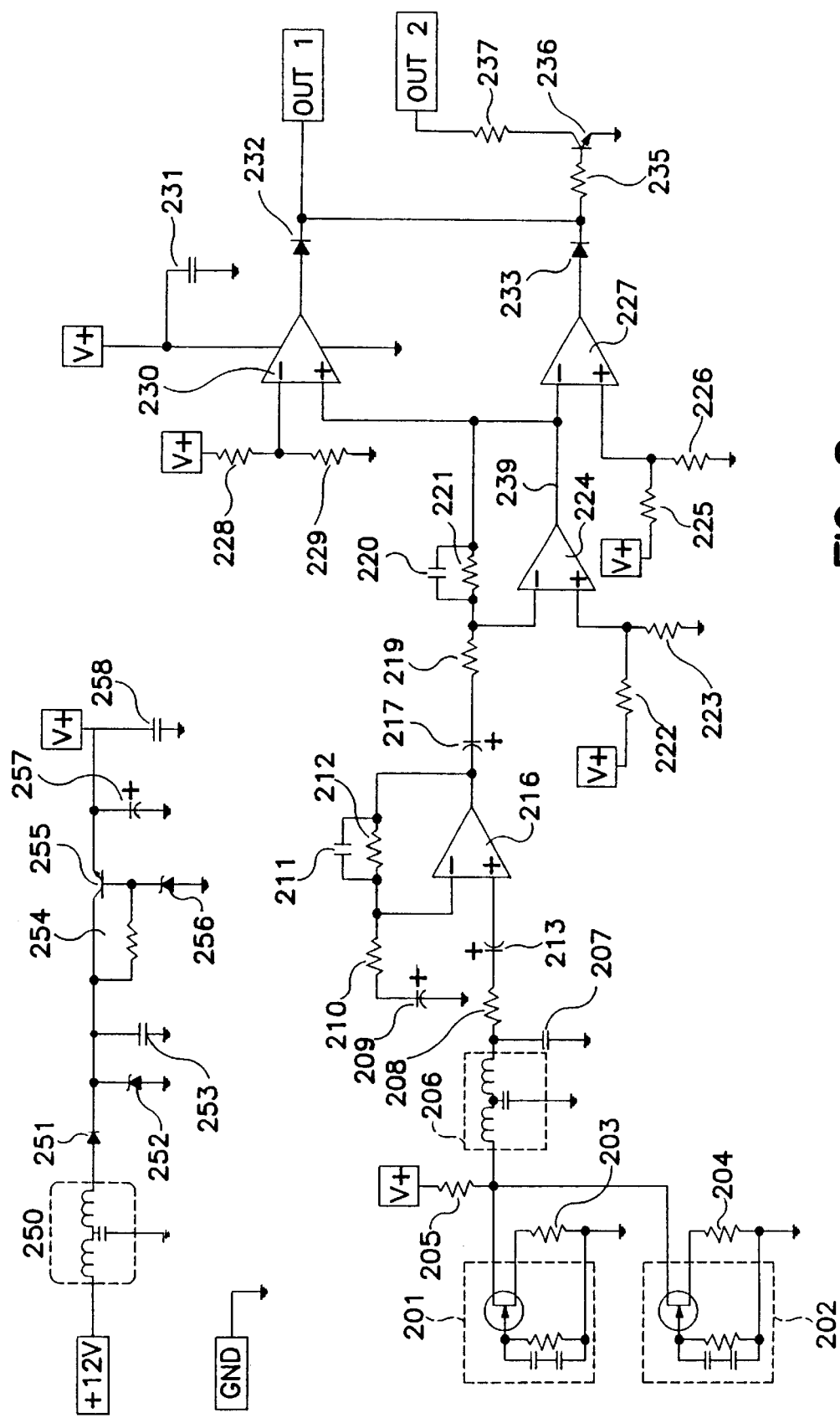
FIG. 6 is a circuit diagram for another dual detector system.

FIG. 6 is another intrusion detection circuit that uses two detectors. Initially, the incoming DC power from the vehicle is filtered by EMI filter 250. Diode 251 protects the remaining circuitry from damage caused by inadvertent power supply reversal, and zener diode 252 protects against an overvoltage condition. Capacitor 253 filters the incoming power.

The input power is then regulated down to 9 volts, which is used to power the electronics. The regulator includes a transistor 255 configured so that the voltage at the emitter will follow the voltage at the base. This base voltage is determined by the zener diode 256, which is supplied with operating current through the resistor 254. Because the zener voltage of the zener diode 256 is present at the base of the transistor 255, the emitter of the transistor 255 will follow the zener voltage. The emitter voltage at the transistor 255 is filtered by an electrolytic capacitor 257 and a nonelectrolytic capacitor 258 (e.g., a ceramic disc capacitor). Two capacitors are used to decouple both high and low frequency noise. The regulated voltage is then used to power the remaining circuitry.

The intrusion detection circuit includes two pyroelectric detectors 201 and 202. The conductance of each pyroelectric detector 201 and 202 changes in response to incident infrared radiation. The circuit including the pyroelectric detector 201 and the resistors 203 and 205 produce a signal at the output of the pyroelectric detector 201 related to the arriving infrared radiation. Similarly, the circuit including the pyroelectric detector 202 and the resistors 204 and 205 produce a signal at the output of the pyroelectric detector 202 related to the arriving infrared radiation. The outputs of the two pyroelectric detectors 201 and 202 are combined because they are both connected to the bottom node of the resistor 205.

This combined output signal is filtered by EMI filter 206. Additional filtering is provided by the capacitors 207 and 213 and the resistor 208. The filtered signal then arrives at the non-inverting input of the operational amplifier (op-amp) 216. Preferably, all the op-amps in the circuit consume very low power and are included together in a single IC (integrated circuit) package. The LP2902 and LP324 op-amps are preferred. Op-amp 216 acts in conjunction with capacitors 209 and 211, and resistors 210 and 212, to provide a first stage of amplification and band-pass filtering.

A second stage of amplification and band-pass filtering is provided by the op-amp 224, in conjunction with the resistors 221 and 219 and the capacitors 217 and 220. The resistors 222 and 223 provide bias for the non-inverting input of the op-amp 224. The output of this second stage amplifier is the signal 239.

The signal 239 is then compared to a lower threshold and an upper threshold by a set of window comparators. When the signal 239 is between the two thresholds, the output transistor 236 turns off. When the signal 239 is outside the two thresholds, the output transistor 236 turns on.

The lower threshold is determined by the voltage divider formed by resistors 225 and 226. If the signal 239 is lower than the lower threshold, the output of op-amp 227, which is used as a comparator, will go to the positive rail. The upper threshold is determined by the voltage divider formed by resistors 228 and 229. If the signal 239 is higher than the upper threshold, the output of op-amp 230, which is also used as a comparator, will go to the positive rail.

When either of the comparator outputs 227 and 230 are driven to the positive rail, the positive voltage will pass through one of the diodes 232 and 233. This signal will then pass through resistor 235 and turn on the output resistor 236. When the output transistor 236 is on, it sinks current through the resistor 237. When neither of the comparator outputs 227 and 230 are at the positive rail, no signal is passed through the diodes 232 and 233, and the transistor 236 will turn off. As a result, no current will be sinked through the resistor 237.

The following table shows one set of suitable component values for the circuit of FIG. 6. Those skilled in the art will recognize where alternative parts may be used.

| reference numbers | type | value/P.N. |
|---|---|---|
| 216, 224, 227, 230 | op amp | ¼ LP2902 |
| 201, 202 | detector | Hamamatsu P6592-02 |
| 255 | transistor | 2N2222 |
| 236 | transistor | MPSA06 |
| 251, 232, 233 | diode | RLR4004 |
| 252 | zener | MM525245 |
| 256 | zener | MM525239 |
| 253, 258, 231 | capacitor | 0.01 $\mu$F |
| 257, 209, 213, 217 | capacitor | 10 $\mu$F |
| 207 | capacitor | 220 pF |
| 211, 220 | capacitor | 0.022 $\mu$F |
| 254 | resistor | 390K |
| 203, 204, 208 | resistor | 100K |
| 205 | resistor | 200K |
| 210 | resistor | 47K |
| 212 | resistor | 470K |
| 222, 223 | resistor | 2M |
| 221, 225, 228 | resistor | 1M |
| 219, 235 | resistor | 10K |
| 229 | resistor | 1.5M |
| 226 | resistor | 680K |
| 237 | resistor | 50 $\Omega$ |
| 250, 206 | EMI filter | Panasonic EXC-EMT103DT |

For improved signal to noise ratio performance, each detector can comprise two parallel sets of elements, with each set comprising two series opposed pyroelectric detecting elements. This configuration can be used with both the single detector circuit and the dual detector circuit described above.

Performance of the circuit can be improved by thermally isolating the PEDs from the surface upon which they are mounted. The circuit can also be shielded against EMI and RFI (electromagnetic and RF interference) by enclosing either the entire circuit or the PEDs inside a Faradaic shell, by keeping the leads at the PED short, using a ground plane and bypass capacitors, and adding ferrite beads or EMI/RFI filters at the power supply and detector outputs. This shielding would reduce the chance of radiation from an external source from causing a false alarm. This is particularly important because cellular phones and remote keyless entry transmitters are commonly used in the vicinity of vehicles, and generate RF signals that could cause interference and result in false alarms.

False alarms can also be eliminated by limiting the field-of-view to an narrow beam aimed at the points of entry. This can easily be accomplished by mounting the PEDs in a recessed hole. This enables the baseline of the detector to be stabilized, which in turn, narrows down the comparator circuit window. Finally, a band pass filter can be used to filter out unwanted signals, as described above.

If installed on the rear-view mirror assembly the detector system may be integrated with the other functions in the rear-view mirror assembly, such as lights, electrochromic functions, compass, keyless entry, etc. In this manner, the circuitry of the detector can be built on the same circuit board as the one used for the other functions in the rear-view mirror assembly. Therefore, some of the elements on the board may be shared. It is further possible to design a single ASIC (Application Specific Integrated Circuit) chip that incorporates the pyroelectric system circuit along with the circuitry for all other functions of the mirror assembly.

Typically, a human body emits radiation in the 8–14 micron wavelength range. This radiation is absorbed by the detector, converted to heat, and later to an electric signal. Therefore, a filter material should be installed between the detector and the view to block radiation in other wavelength ranges to avoid false alarms. A lens can also be positioned between the detector and the view to focus the radiation onto a small spot on the detector. The design of the lens influences the angle of view perceived by the system. Ideally, the lens should be of a material which will act as a filter that transmits radiation in the 8–14 micron wavelength range and blocks radiation in the 0.3 to 3 micron region. Filtering out visible light prevents false alarms caused by moving shadows outside the vehicle that momentarily fall on the detector. Glass windows in automobiles and aircraft do not transmit radiation above 2–3 microns. By using a detector filter window which transmits principally in the 8–14 micron range, only radiation originating from the interior of the vehicle, and not from the vehicle surroundings, will be detected.

The filter window materials may be made with at least one of Ge, Si, ZnS, CdS or Polyolefin (including Polypropylene, Polyethylene, Polymethylpentene, copolymers, etc.) because they transmit in the 8–14 micron wavelength. Ge has better transmission properties than Si in the infrared region but is more expensive than Si. An inexpensive plastic Fresnel lens, commercially available for infrared applications, may be used. When multiple detectors are used, an individual window may be used for each detector.

In order to increase the field of view of the device while simultaneously minimizing the costs associated with additional detectors, a reflector may be positioned around the detector to collect the radiation from a wider angle. Other optical configurations such as a fish eye lens, a diffractive optic lens, or a combination of such lenses may also be used. The optical elements can also be designed to allow flexibility in the orientation and the location of the detector placement. For example, the detector located in the interior mirror assembly could be forward facing, but a reflector system could collect the radiation from the desired locations of the vehicle and transmit the same to the detector.

The filter window may comprise multiple film interference filters such that interference of the layers blocks unwanted wavelengths. If no other filters are used, it may be necessary to provide a scratch resistant window. Ge windows are typically coated with a layer of ZnS which is durable and scratch-resistant.

The sensitivity as well as the direction of the pyroelectric intrusion system may be set by the user. The ambient temperature inside a vehicle is influenced by the time of day, environmental conditions such as outdoor weather and the seasons, and whether the vehicle is parked indoors or out. When the interior of the vehicle is expected to be around 38° C. (about 98° F.), a higher sensitivity setting may be preferable because the temperature difference between the intruder's body and the vehicle interior is small. In addition, the user may also want to aim the detector towards a particular position to enhance detection. If the detector is connected to the rear-view mirror itself, the driver has the freedom to adjust the field-of-view of the detector by moving the rear-view mirror. Alternatively, the detector could be mounted in a pod so that it remains stationary despite any movement of the mirror.

Power should be provided to the system even when the vehicle is turned off. Power may be provided from the vehicle battery, an auxiliary battery, a solar cell or any other readily available power source. Optionally, a rechargeable battery can be used together with a solar cell for charging the battery.

When the vehicle is not in use, the only available power source for operating the system is often a battery (such as a 12V lead acid battery typically used in automobiles). In this case, minimizing power consumption by minimizing current draw becomes particularly important, because vehicles operating on battery power have a finite power capacity (which is typically on the order of 20 to 100 Amp-hours in automobiles). If too much current is drawn from the battery when the vehicle is not used for extended periods, the battery may not have sufficient energy to start the engine when the vehicle is eventually used. The amount of current that will drain a battery depends on the amount of time the current is being drawn. Because the amount of time between uses of a vehicle may range from minutes to hours, days, or even weeks, reducing the current drain becomes very important.

Preferably, the entire system consumes below 5.0 mA at 12 V, more preferably below 1.5 mA, and most preferably below 0.3 mA. This level of power consumption does not cause any significant power drain on the vehicle battery, even when the system operates for extended periods of time. It can be compared, for example, to Ford cars which may draw up to 23 mA at 12 V when parked to keep the clock and other electronic features of the vehicle running. The use of low power components, such as the LP2902 and LP324 op-amps, helps reduce the power consumption of the circuit. Implementing the circuitry in an ASIC can help reduce power consumption even further.

The system may be turned on manually from inside the vehicle. For example, the detector can be activated or deactivated by punching a code on a keypad located anywhere in the vehicle. When the system is turned on, some delay may be needed to allow the driver to exit the vehicle and for the system to reach equilibrium.

Alternately, the system may be turned on remotely from outside the vehicle, using a handheld unit. The handheld unit may contain one or more pushbuttons. Remote activation allows the user to arm or disarm the system while outside of the field-of-view of the detector. Therefore, the delay can be reduced in remote activation systems because the system will not need to equilibrate itself.

Returning to FIG. 1, upon sensing the presence of an intruder, an RF alert signal will be generated by the transceiver 16 mounted in the vehicle. This RF signal is received by the handheld unit 18, which causes a buzzer located in the handheld unit to sound. The buzzer may optionally be turned off after 10 seconds to conserve power for the vehicle-mounted transceiver. By this time, a trigger will be registered in the circuit 17. If the driver is out of range of the RF transmission, this trigger will be retransmitted to the handheld unit when the driver eventually comes within range. In this manner, the driver can be alerted to the presence of an intruder and proper safety measures can then be taken. The time lag between the alarm and the buzzer sounding depends on the distance and location of the person from the vehicle. This time lag is typically on the order of one second or less. The handheld unit may also include a vibrating option, similar to most paging systems. The handheld unit may have a rechargeable battery that can be charged through the cigarette lighter or through another mechanism.

Various alert alternatives may be used, including audible and visual alerts. In cars, this could include the flashing of headlights and interior lights, the sounding of a horn, the locking of doors, the locking of the ignition, irreversible power freeze, and a cellular phone call to 911 or another user-specified number to alert the user. Various alternate transmission methods may also be used, including transmission using microwaves, light (including IR), radar, acoustics and cellular phones.

Figure 7:
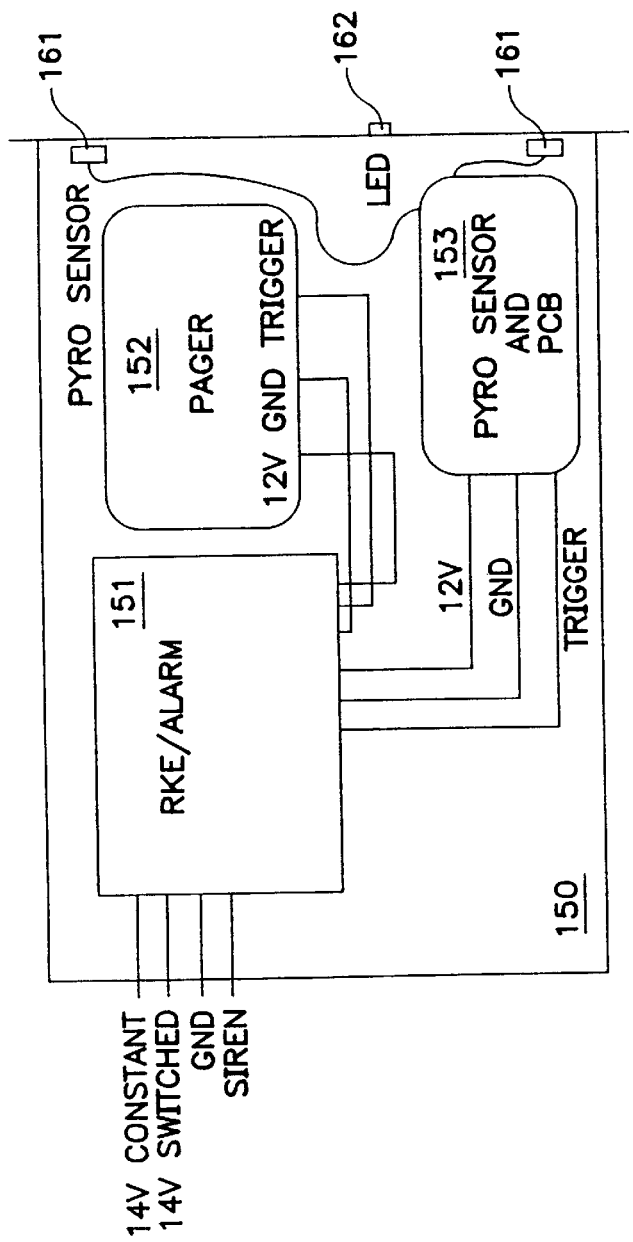
FIG. 7 is a block diagram of an intrusion detection system using a pyroelectric detector for use in aircraft.

Similar alert mechanisms may also be used in aircraft. But because aircraft and avionics systems are generally more valuable than automobiles, more sophisticated alert mechanisms may be desired for aircraft. These could include using a paging system to alert the user or owner of the aircraft. FIG. 7 is a block diagram of one such a system. The outputs of the pyroelectric detectors 161 are processed by appropriate electronic circuitry 153 as described above. A conventional Remote Keyless Entry (RKE) and Alarm system 151 receives a trigger signal from the circuitry 153 when an intrusion has been detected. The RKE/Alarm system 151 can then signal the pager 152 to page a remote receiver. In this configuration, the owner carries a pager receiver (not shown) which will be activated by the signal from the pager 152. The paging system may be proprietary, or, alternatively, it may make use of existing paging systems. The system could even be interfaced with a global positioning system (GPS). In this configuration, when intrusion occurs, the GPS equipment will be turned on and will send the vehicle's position to the transmitter, for transmission to the owner. A 2-way remote communications link can also be installed between the aircraft system and the aircraft owner.

The intrusion system may also activate other safety or security features, such as a visible or infra-red camera located in the vehicle. The VV6850 and VV5850 CMOS image sensors from VLSI Vision Ltd. in Scotland are suitable for this purpose, as are numerous other cameras. The camera can take a snapshot or a video of the vehicle interior upon alarm triggering and store the image in a memory system. At night, an infrared or visible light may be turned on briefly to enhance the picture quality. The image can also be transmitted and stored in the handheld unit where it may also be viewed on a display, or transmitted to a remote receiver.

While the pyroelectric intrusion detection circuitry itself consumes very low power, as described above, once an intrusion has been detected, power consumption may be temporarily increased to alert the owner and, optionally, to confirm the intrusion. This can be accomplished by leaving the power to the alert and confirmation circuitry off until the alert or confirmation function is needed. At that point, the circuitry can be awakened (i.e. activated) and used to perform its intended function.

Intrusion confirmation can be implemented by having the pyroelectric circuitry activate secondary systems such as radar, ultrasonic or video cameras, and other imaging systems to confirm the intrusion. The alert signal is only activated if the secondary system confirms the intrusion, thereby reducing the probability of false alarms.

If an intruder destroys the PED system upon entry, the destruction will break a circuit which will instantaneously register an alarm. This information may also be sent to the handheld unit or stored elsewhere in the vehicle to alert the driver upon his/her return. For example, as soon as the PED is destroyed, the system could start transmitting continuously or at one-minute intervals. Once the user comes within the field-of-view of the detector, the hand-held remote transceiver would begin to beep or vibrate. The circuit can also be designed to check for the electrical continuity of the detector, hence ensuring that the detector is part of the circuit. The remote unit may also be configured to warn the driver of a communications failure while the driver is still at a safe distance from the vehicle.

Optionally, a solar panel that charges a rechargeable battery can be used as a power source for the pyroelectric detector system. For example, the forward facing surface of a mirror pod mount that is equipped with the pyroelectric detection system can contain a solar cell or panel so that light incident thereon after passage through the vehicle windshield generates electrical power to run the circuitry of the pyroelectric detector system. A rechargeable battery is also included as an alternate power source for use when the solar power is ineffective, such as at night or when the vehicle is parked indoors. During the daytime, the solar cell or panel recharges the battery.

Optionally, the power to the circuitry of the pyroelectric detection system can be switched on and off at a frequency of, for example, 0.25 Hz to about 5 Hz (more preferably, 0.75 Hz to 1 Hz), so that power consumption over long periods is even further minimized. With this arrangement, the pyroelectric detection system is activated in short bursts that repeat about once a second.

Other variations and modifications of this invention will be obvious to those skilled in this art. This invention is not limited except as set forth in the following claims.

What is claimed is:

1. A system for detecting the presence of a human in a compartment of a vehicle comprising:
    a pyroelectric sensor disposed at a surface of the compartment and a control coupled to said pyroelectric sensor;
    said pyroelectric sensor comprising a first sensing element and a second sensing element, said first sensing element arranged in an opposed electrical connection with respect to said second sensing element whereby infrared radiation from a human moving within the compartment is differentially detected by said first sensing element and said second sensing element, and ambient thermal radiation is commonly detected by said first sensing element and said second sensing element, thereby producing an output signal with reduced sensitivity to ambient thermal radiation; and
    said output signal being received by said control, said control generating a control signal indicative of detection of a human within the compartment; and
    said first sensing element and said second sensing element being thermally isolated from the surface.

2. A system according to claim 1, wherein a radiation filter element is disposed in front of said pyroelectric sensor.

3. A system according to claim 2, wherein said filter element comprises at least one of Ge and Si.

4. A system according to claim 2, wherein said filter element comprises ZnS.

5. A system according to claim 2, wherein said filter element comprises Polyolefin.

6. A system according to claim 2, wherein said filter element preferentially passes radiation having wavelength between approximately 8 and 14 microns.

7. A system according to claim 2, wherein said pyroelectric sensor and said filter element are provided as a module.

8. A system according to claim 1, wherein said control comprises an electronic band-pass filter.

9. A system according to claim 8, wherein said electronic band-pass filter passes frequencies greater than 0.1 Hz.

10. A system according to claim 8, wherein said electronic band-pass filter passes frequencies greater than 0.1 Hz and less than 10 Hz.

11. A system according to claim 8, wherein said electronic band-pass filter passes frequencies greater than 0.5 Hz and less than 10 Hz.

12. A system according to claim 8, wherein said electronic band-pass filter passes frequencies greater than 1 Hz and less than 5 Hz.

13. A system according to claim 1, wherein said control resolves movement of a human moving at a distance of within about 1 to 5 meters of said pyroelectric sensor.

14. A system according to claim 1, wherein said control resolves movement of a human moving at a frequency of approximately 5 Hz.

15. A system according to claim 1, wherein said system has a power consumption of less than 1 Watt when connected to vehicle battery power and when the vehicle is in the parked state.

16. A system according to claim 1, wherein said system has a power consumption of less than 0.02 Watt when connected to vehicle battery power and when the vehicle is in the parked state.

17. A system according to claim 1, further comprising a lens, said lens focusing incident radiation onto said pyroelectric sensor.

18. A system according to claim 17, wherein said lens comprises a material that transmits radiation in approximately the 8 to 14 micron wavelength range.

19. A system according to claim 17, wherein said lens blocks radiation having a wavelength of approximately 0.3 to 3 microns.

20. A system according to claim 17, wherein said lens comprises a material comprising at least one of Ge, Si, ZnS, CdS and a polyolefin.

21. A system according to claim 17, wherein said lens comprises a polyolefin material.

22. A system according to claim 17, wherein said lens comprises a material including at least one of a polypropylene material, a polyethylene material and a polymethylpentene material, or a copolymer thereof.

23. A system according to claim 17, wherein said lens comprises at least one of a fish eye lens, a diffractive optic lens, a wide angle lens and a Fresnel lens.

24. A system according to claim 17, wherein said lens comprises a plastic lens.

25. A system according to claim 1, wherein said system consumes a current of less than approximately 5.0 mA when operating under vehicle battery power.

26. A system according to claim 1, wherein said system consumes a current of less than approximately 1.5 mA when operating under vehicle battery power.

27. A system according to claim 1, wherein said compartment comprises an interior compartment of the vehicle.

28. A system according to claim 1, wherein said control comprises an application specific integrated circuit.

29. A system according to claim 1, wherein said opposed first and second sensing elements are arranged in a parallel opposed connection.

30. A system according to claim 1, wherein said opposed first and second sensing elements are arranged in a series opposed connection.

31. A system according to claim 1, wherein said compartment comprises a trunk compartment of the vehicle.

32. A system for detecting the presence of a human in a compartment of a vehicle comprising:

a pyroelectric sensor disposed at a surface of the compartment and a control coupled to said pyroelectric sensor;

said pyroelectric sensor comprising a first sensing element and a second sensing element, said first sensing element arranged in an opposed electrical connection with respect to said second sensing element whereby infrared radiation from a human moving within the compartment is differentially detected by said first sensing element and said second sensing element, and ambient thermal radiation is commonly detected by said first sensing element and said second sensing element, thereby producing an output signal with reduced sensitivity to ambient thermal radiation;

wherein a radiation filter element is disposed in front of said pyroelectric sensor;

wherein said control comprises an electronic band-pass filter;

wherein said output signal is received by said control, said control generating a control signal indicative of detection of a human within the compartment; and wherein said first sensing element and said second sensing element being thermally isolated from the surface.

33. A system according to claim 32, wherein said filter element transmits radiation of wavelength greater than about 3 microns.

34. A system according to claim 33, wherein said filter element comprises at least one of Ge and Si.

35. A system according to claim 33, wherein said filter element comprises ZnS.

36. A system according to claim 33, wherein said filter element comprises Polyolefin.

37. A system according to claim 33, wherein said pyroelectric sensor and said filter element are provided as a module.

38. A system according to claim 32, wherein said electronic band-pass filter passes frequencies greater than 0.1 Hz.

39. A system according to claim 32, wherein said electronic band-pass filter passes frequencies greater than 0.5 Hz.

40. A system according to claim 32, wherein said electronic band-pass filter passes frequencies greater than 0.1 Hz and less than 10 Hz.

41. A system according to claim 32, wherein said electronic band-pass filter passes frequencies greater than 0.5 Hz and less than 10 Hz.

42. A system according to claim 32, wherein said electronic band-pass filter passes frequencies greater than 1 Hz and less than 5 Hz.

43. A system according to claim 32, wherein said filter element preferentially passes radiation having wavelength between approximately 8 and 14 microns.

44. A system according to claim 32, wherein said control resolves movement of a human moving at a distance of within about 1 to 5 meters of said pyroelectric sensor.

45. A system according to claim 32, wherein said control resolves movement of a human moving at a frequency of approximately 5 Hz.

46. A system according to claim 32, wherein said system has a power consumption of less than 1 Watt when connected to vehicle battery power and when the vehicle is in the parked state.

47. A system according to claim 32, wherein said system has a power consumption of less than 0.02 Watt when connected to vehicle battery power and when the vehicle is in the parked state.

48. A system according to claim 32, further comprising a lens, said lens focusing incident radiation onto said pyroelectric sensor.

49. A system according to claim 48, wherein said lens comprises a material that transmits radiation in approximately the 8 to 14 micron wavelength range.

50. A system according to claim 48, wherein said lens blocks radiation having a wavelength of approximately 0.3 to 3 microns.

51. A system according to claim 48, wherein said lens comprises a material comprising at least one of Ge, Si, ZnS, CdS and a polyolefin.

52. A system according to claim 48, wherein said lens comprises a polyolefin material.

53. A system according to claim 48, wherein said lens comprises a material including at least one of a polypropylene material, a polyethylene material and a polymethylpentene material, or a copolymer thereof.

54. A system according to claim 48, wherein said lens comprises at least one of a fish eye lens, a diffractive optic lens, a wide angle lens and a Fresnel lens.

55. A system according to claim 48, wherein said lens comprises a plastic lens.

56. A system according to claim 32, wherein said system consumes a current of less than approximately 5.0 mA when operating under vehicle battery power.

57. A system according to claim 32, wherein said system consumes a current of less than approximately 1.5 mA when operating under vehicle battery power.

58. A system according to claim 32, wherein said compartment comprises an interior compartment of the vehicle.

59. A system according to claim 32, wherein said control comprises an application specific integrated circuit.

60. A system according to claim 32, wherein said opposed first and second sensing elements are arranged in a parallel opposed connection.

61. A system according to claim 32, wherein said opposed first and second sensing elements are arranged in a series opposed connection.

62. A system according to claim 32, wherein said compartment comprises a trunk compartment of the vehicle.

63. A system for detecting the presence of a human in a compartment of a vehicle comprising:

a pyroelectric sensor disposed at a surface of the compartment and a control coupled to said pyroelectric sensor;

said pyroelectric sensor comprising a first sensing element and a second sensing element, said first sensing element arranged in an opposed electrical connection with respect to said second sensing element whereby infrared radiation from a human moving within the compartment is differentially detected by said first sensing element and said second sensing element, and ambient thermal radiation is commonly detected by said first sensing element and said second sensing element, thereby producing an output signal with reduced sensitivity to ambient thermal radiation;

wherein a radiation filter element is disposed in front of said pyroelectric sensor;

wherein said system further comprises a lens, said lens focusing incident radiation onto said pyroelectric sensor;

wherein said output signal is received by said control, said control generating a control signal indicative of detection of a human within the compartment; and wherein said first sensing element and said second sensing element being thermally isolated from the surface.

64. A system according to claim 63, wherein said filter element transmits radiation of wavelength greater than about 3 microns.

65. A system according to claim 64, wherein said filter element comprises at least one of Ge and Si.

66. A system according to claim 64, wherein said filter element comprises ZnS.

67. A system according to claim 64, wherein said filter element comprises Polyolefin.

68. A system according to claim 64, wherein said pyroelectric sensor and said filter element are provided as a module.

69. A system according to claim 63, wherein said control comprises an electronic band-pass filter.

70. A system according to claim 69, wherein said electronic band-pass filter passes frequencies greater than 0.1 Hz.

71. A system according to claim 69, wherein said electronic band-pass filter passes frequencies greater than 0.1 Hz and less than 10 Hz.

72. A system according to claim 69, wherein said electronic band-pass filter passes frequencies greater than 0.5 Hz and less than 10 Hz.

73. A system according to claim 69, wherein said electronic band-pass filter passes frequencies greater than 1 Hz and less 5 Hz.

74. A system according to claim 63, wherein said filter element preferentially passes radiation having wavelength between approximately 8 and 14 microns.

75. A system according to claim 63, wherein said control resolves movement of a human moving at a distance of within about 1 to 5 meters of said pyroelectric sensor.

76. A system according to claim 63, wherein said control resolves movement of a human moving at a frequency of approximately 5 Hz.

77. A system according to claim 63, wherein said system has a power consumption of less than 1 Watt when connected to vehicle battery power and when the vehicle is in the parked state.

78. A system according to claim 63, wherein said system has a power consumption of less than 0.02 Watt when connected to vehicle battery power and when the vehicle is in the parked state.

79. A system according to claim 63, wherein said lens comprises a material that transmits radiation of at least 8 microns in wavelength.

80. A system according to claim 79, wherein said lens blocks radiation having a wavelength of approximately 0.3 to 3 microns.

81. A system according to claim 79, wherein said lens comprises a material comprising at least one of Ge, Si, ZnS, CdS and a polyolefin.

82. A system according to claim 79, wherein said lens comprises a polyolefin material.

83. A system according to claim 79, wherein said lens comprises a material including at least one of a polypropylene material, a polyethylene material and a polymethylpentene material, or a copolymer thereof.

84. A system according to claim 79, wherein said lens comprises at least one of a fish eye lens, a diffractive optic lens, a wide angle lens and a Fresnel lens.

85. A system according to claim 79, wherein said lens comprises a plastic lens.

86. A system according to claim 63, wherein said lens comprises a material that transmits radiation in approximately the 8 to 14 micron wavelength range.

87. A system according to claim 63, wherein said system consumes a current of less than approximately 5.0 mA when operating under vehicle battery power.

88. A system according to claim 63, wherein said system consumes a current of less than approximately 1.5 mA when operating under vehicle battery power.

89. A system according to claim 63, wherein said compartment comprises an interior compartment of the vehicle.

90. A system according to claim 63, wherein said control comprises an application specific integrated circuit.

91. A system according to claim 63, wherein said opposed first and second sensing elements are arranged in a parallel opposed connection.

92. A system according to claim 63, wherein said opposed first and second sensing elements are arranged in a series opposed connection.

93. A system according to claim 63, wherein said compartment comprises a trunk compartment of the vehicle.

* * * * *